J. Edson,
Carpet Sweeper,
Nº 23,526. Patented Apr. 5, 1859.
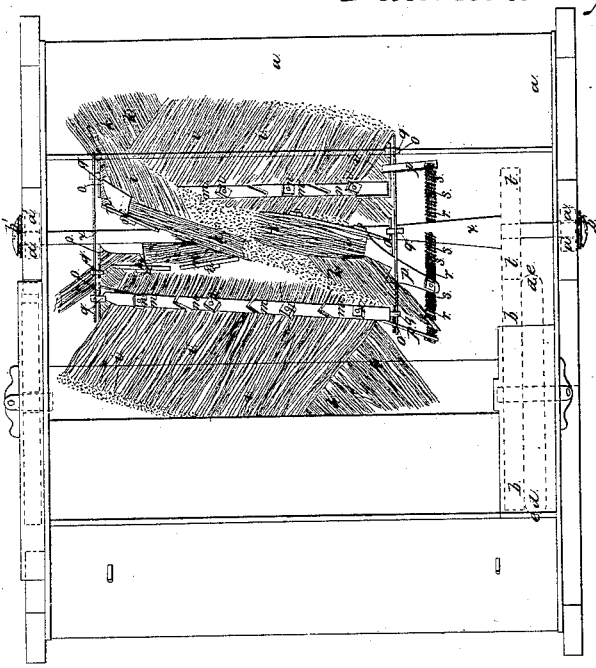
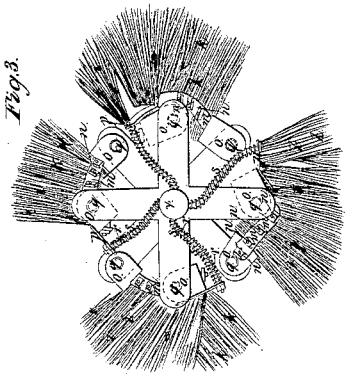
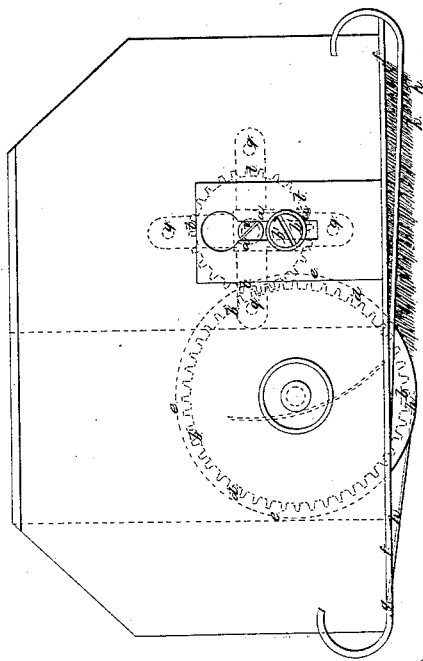
Witnesses.
Joseph Garrett
Albert M. Brown
Inventor.
Jacob Edson

UNITED STATES PATENT OFFICE.

JACOB EDSON, OF BOSTON, MASSACHUSETTS, ASSIGNOR TO HIMSELF AND H. F. GARDNER, OF SAME PLACE.

CARPET-SWEEPER.

Specification of Letters Patent No. 23,526, dated April 5, 1859.

*To all whom it may concern:*

Be it known that I, JACOB EDSON, of Boston, in the county of Suffolk and State of Massachusetts, have invented certain new and useful Improvements in Sweepers, and that the following description, taken in connection with the accompanying drawings hereinafter referred to, forms a full and exact specification of the same, wherein I have set forth the nature and principles of my improvements, by which my invention may be distinguished from all others of a similar class, together with such parts as I claim and desire to have secured to me by Letters Patent.

The figures of the accompanying plate of drawings represent my improvements.

Figure 1 is an end elevation of my improved sweeper. Fig. 2 is a plan or top view with the cover of the machine raised. Fig. 3 is a view of one end of the brush. Figs. 4, 5, 6, 7, are views in detail to be hereinafter referred to.

My invention embraces six improvements as follows:

First, for sweeping carpets or surfaces liable to be injured, it is desirable to have the driving-wheel protected by a rubber or other soft elastic ring or tire. My improvement consists in holding a rubber tire in its place on the driving wheel, by means of a groove in the said wheel, into which the rubber tire is sprung and by which it is rigidly held. The advantage that I derive from this arrangement is, that I am thus enabled to dispense with a solid rubber ring or tire which would otherwise be necessary and which adds materially to the expense, and use in lieu thereof, a section of rubber hose, (which is much cheaper than a solid rubber tire) of a little less diameter than that of the driving wheel.

Second, the use of a flap or float, which is hinged to the bottom of the machine, and drops by its own weight in contact with the surface to be swept and in front of the brooms, so as to prevent the rising of the dust. This arrangement also allows me to arrange the brooms or brushes at a sufficient distance from the edge of the bottom plate of the machine, to prevent their being worn out by coming in contact therewith, which would necessarily occur if the brooms were arranged sufficiently close to the said plate to prevent the escape of dust.

Third, the best mode of arranging the brooms is to place them either at an acute or an obtuse angle to the surface to be swept, as when placed perpendicularly thereto, they rapidly wear out. But if placed at the proper angle, it is obvious, that only a narrow brush could be obtained by any mode heretofore used. My improvement consists in the use of two sets of brooms arranged on their common shaft in such a manner that they cross each other diagonally, thereby greatly increasing the strength of the broom or brush and allowing the use of a much wider one than has previously been possible with an inclined set of brooms.

Fourth, holding the brooms upon their shaft by sectional, adjustable pieces or clamps, that reach by or overlap each other, so that while all the brooms are rigidly held in place, any portion or section of them can be adjusted at pleasure, or removed and new ones inserted when the old ones become worn.

Fifth, hanging the broom shaft in such a manner, by means of a hinge and a yielding spring, that the brooms will adapt themselves to any inequalities of surface and perform their work as thoroughly as though on a level plane.

Sixth, an arrangement of devices for setting up the gears when they become worn and to prevent their rattling and also to lower the brooms, when they become worn.

$a$ $a$ in the drawings represent the outer casing of the machine.

$b$ $b$ is the main gear or driving wheel, which is to bear and run upon the surface to be swept. This wheel is formed with a groove $c$ cut around the periphery of a projection $d$ of the same, into which is inserted a transverse section of a hose, as shown in Fig. 4, which is sprung over and upon the wheel $b$ $b$ and held there by the groove $c$. By this means I am enabled to use a rubber tire, which is much cheaper than a solid rubber ring, a result that could not be secured without the peculiar means adopted for securing and holding the tire in its place.

To the bottom plate $f$ $f$ is hinged at $g$ a flap or float $h$, which, by its own weight drops upon the surface to be swept and forms a barrier for the dust to strike against and prevents its rising. Without the use of this flap or float, the bottom plate $f\ f$ would have to be placed, in order to prevent the escape of dust, close up to the brooms, which would soon become worn off.

The brooms consist of two sets $i\ i$—$k\ k$ arranged upon a shaft $l\ l$ in such a manner as to cross each other diagonally, as shown in the drawings, whereby the whole broom is strengthened and a wider one obtained than otherwise could be employed with the advantage of using brooms inclined at other than a right angle to the surface to be swept. The brooms are held upon their shaft by adjustable clamps $m\ m$, &c., fastened by nuts $n\ n$. The clamps $m\ m$ have forked ends which pass by or overlap each other as shown in the drawings, so that every portion of the brooms shall be rigidly held and yet allow of their being adjusted and removed at pleasure or new ones inserted at any one section. To the end of the broom shaft $l\ l$ are attached projections $o, o, p$ one of which $o$, turns upon a hinge or pivot joint at $q$, and the other, $p$, slides upon a bent rod $r$ against a spiral spring $s$. By this arrangement of the broom shaft turning upon the hinge or pivot joint and the action of the spiral spring, it will be seen that while the brooms are kept close to their work, they will also adapt themselves to any inequalities of the surface to be swept.

In Figs. 1 and 6 an arrangement of devices is shown for providing for the wear of the brush or of the gears, the axle of the brush being in a metallic, movable plate $a'\ a'$, which can be moved up, or down, or sidewise and thus lower the shaft $x$ and consequently the brush as fast as it becomes worn, or set the gears $b\ b$—$t\ t$, nearer to each other as the teeth become worn, being fastened by a set-screw $b'$ in any desired position as will readily be understood by inspection of Figs. 1 and 6.

Having thus described my improvements, I shall state my claim as follows:

What I claim as my invention and desire to have secured to me by Letters Patent, is—

1. Holding the rubber tire upon the driving wheel by means of the groove $c$ formed in the said wheel as described, whereby I am enabled to use a cheaper form of soft or elastic tire than would otherwise be possible as set forth.

2. The use of the flap or float $h$ arranged and operating as described, for preventing the escape of dust and the wear of the brooms as set forth.

3. Arranging two sets of brooms on their common shaft in such a manner that they shall cross each other diagonally as described and for the purposes set forth.

4. Holding the brooms upon their shaft by sectional, adjustable clamps that reach by or overlap each other whereby while every portion of the brooms is securely held, they can be adjusted at pleasure or new ones inserted.

5. Hanging the broom shaft in such a manner, by means of the hinge or pivot joint and yielding spring, that the brooms will adapt themselves to any and all inequalities of the surface to be swept and at the same time perform their work thoroughly.

JACOB EDSON.

Witnesses:
JOSEPH GAVETO,
ALBERT W. BROWN.